April 16, 1968  A. D. HOLIDAY ET AL  3,378,598
PRODUCTION AND PURIFICATION OF CYCLOHEXADIENE
Filed May 20, 1965
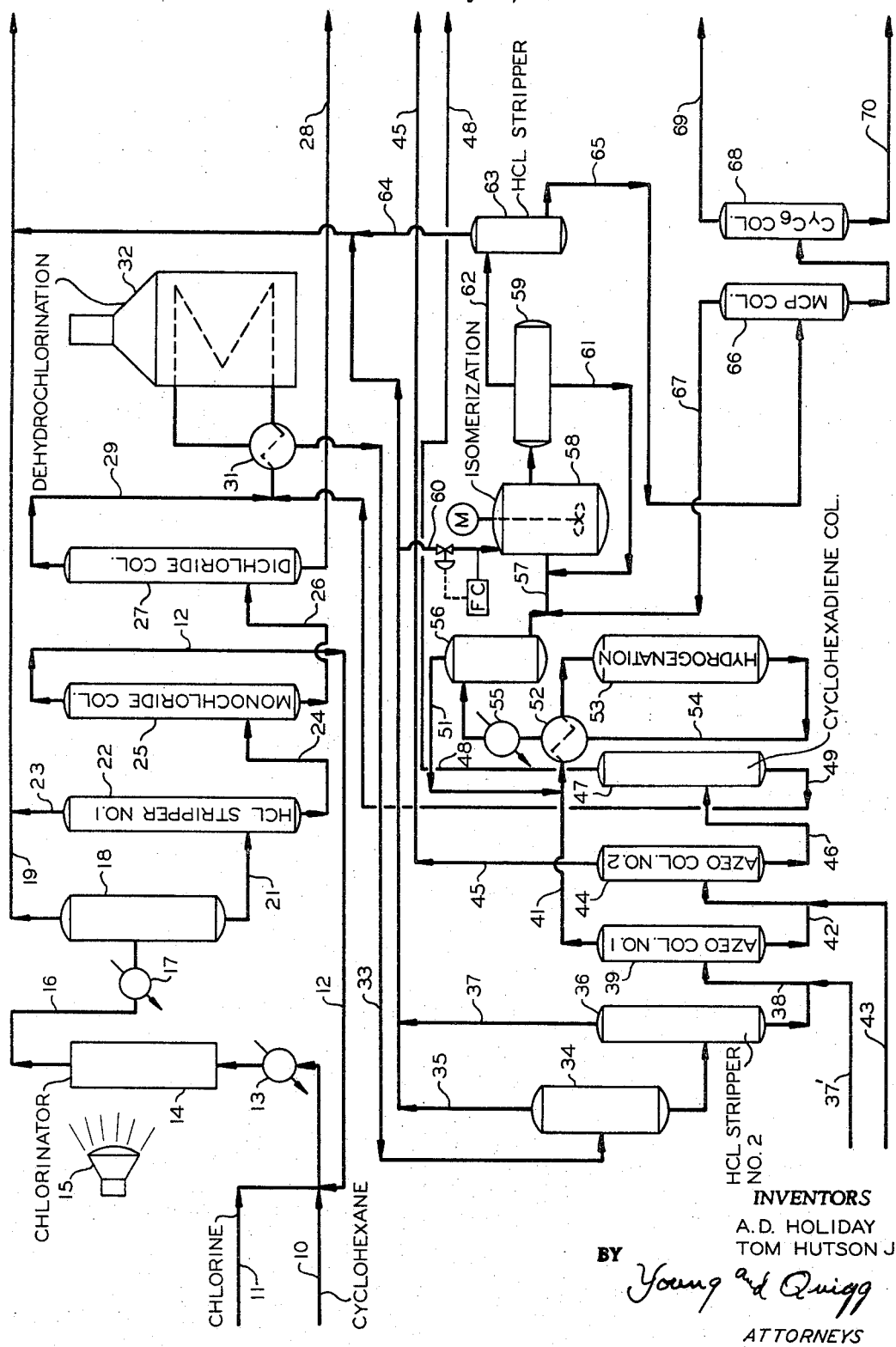
INVENTORS
A.D. HOLIDAY
TOM HUTSON JR.
BY Young and Quigg
ATTORNEYS

United States Patent Office 3,378,598
Patented Apr. 16, 1968

3,378,598
PRODUCTION AND PURIFICATION OF CYCLOHEXADIENE
Allan D. Holiday and Thomas Hutson, Jr., Bartlesville, Okla., assignors to Phillips Petroleum Company, a corporation of Delaware
Filed May 20, 1965, Ser. No. 457,418
2 Claims. (Cl. 260—666)

This invention relates to a novel method and means for producing substantially pure cyclohexadiene. In one aspect the invention relates to a method and means for converting cyclohexane to cyclohexadiene. In another aspect the invention relates to an improved method and means for dehydrohalogenating dihalocyclohexane.

Cyclohexadiene is a reactive hydrocarbon useful as a starting material or an intermediate in the synthesis of hydrocarbon products such as epoxy resins. Cyclohexadiene is also useful as a cross-linking agent in the manufacture of ethylene-propylene rubber. Extensive use of cyclohexadiene has been unattractive because it has been an expensive chemical to produce.

Various proposals have been advanced for the production of cyclohexadiene including dehydrohalogenation of the dihalide of cyclohexane but heretofore such processes have not been attractive because of the low yield of cyclohexadiene due to the formation of by-products, e.g. in the dehydrhalogenation reactions previously employed.

It is an object of this invention to provide an efficient and economical process and apparatus for producing and purifying cyclohexadiene. It is also an object of this invention to provide a process and apparatus for the efficient and economical dehydrohalogenation of dihalocyclohexane. Still another object of this invention is the provision of a method and means for converting cyclohexane into cyclohexadiene in high yield. Other objects and advantages of this invention will become apparent to one skilled in the art upon studying this disclosure including the detailed description of the invention and the appended drawing wherein:

The sole figure is a schematic flow diagram of a preferred embodiment of the invention for converting cyclohexane to cyclohexadiene.

According to the invention cyclohexane is halogenated, e.g. chlorinated, in a staged photochemical chlorination process to obtain a relatively high yield of dichlorocyclohexane with a minimum of by-products; dehydrochlorinating the dichlorocyclohexane in a ferruginous reactor at a temperature in the range of about 800 to 1100° F. and at a space velocity of about 2 to 8 volumes of liquid per hour per volume of reactor per hour; removing by-product benzene from the dehydrochlorination process effluent by azeotropic distillation with methylcyclopentane to form an overhead product of an azeotrope of benzene and methylcyclopentane; hydrogenating the benzene to form cyclohexane; isomerizing the methylcyclopentane to form cyclohexane; recycling the cyclohexane so produced to the photochemical chlorination reaction; and removing cyclohexene from the cyclohexadiene product by azeotropic distillation with a mixture of water and isobutyl alcohol to form an azeotrope with the cyclohexene as the overhead product.

Referring now to the drawing, cyclohexane in conduit 10 is admixed with chlorine in conduit 11 and with recycle cyclohexane and monochlorocyclohexane in conduit 12, is cooled in heat exchanger 13 and passed to chlorinator 14 wherein the chlorination reaction is activated by radiation from source 15 which can be an ultraviolet lamp. The chlorinator effluent is passed via conduit 16 through heat exchanger 17 where it is cooled and thence to separator 18 where hydrogen chloride formed in the chlorinator and not dissolved in the liquid product is removed overhead via conduit 19. The liquid products are passed via conduit 21 to HCl stripper 22 where dissolved hydrogen chloride is vaporized and removed via conduit 23. The liquid product is passed via conduit 24 to the monochloride column 25 where cyclohexane and monochlorocyclohexane are vaporized and returned to the chlorinator as recycle via conduit 12. The liquid from monochloride column 25 is passed via conduit 26 to dichloride column 27 where polychlorides heavier than dichlorocyclohexane are removed as kettle product via conduit 28 and dichlorocyclohexane is removed overhead and passed via conduit 29 through heat exchanger 31 to dehydrochlorination furnace 32. The dehydrochlorination furnace effluent is then passed through heat exchanger 31 via conduit 33 to liquid-gas separator 34 where undissolved hydrogen chloride is removed overhead via conduit 35. The liquid products from separator 34 are passed to hydrogen chloride stripper 36 where dissolved hydrogen chloride is vaporized and removed via conduit 37. The liquid products removed from HCl stripper 36 are admixed with methylcyclopentane from conduit 37' and passed via conduit 38 to azeotrope column 39 where azeotropic mixture of benzene (a by-product of the dehydrochlorination reaction) and methylcyclopentane are removed overhead as a vapor via conduit 41. The liquid products in azeotropic column 39 comprise cyclohexadiene, cyclohexene, cyclohexane, and dichlorocyclohexane. The liquid products in azeotropic column 39 are removed via conduit 42, admixed with a mixture of water and isobutyl alcohol supplied via conduit 43 and passed to a second azeotropic column 44. An azeotropic mixture of cyclohexene, water and isobutyl alcohol is removed from column 44 via conduit 45. This stream, upon being cooled and condensed, separates into a liquid cyclohexene phase and a liquid water-isobutyl alcohol phase. The water-isobutyl alcohol phase is separated in a conventional phase separator and recycled to azeotropic column 39.

The liquid products in azeotropic column 44 are removed via conduit 46 and passed to cyclohexadiene column 47 where cyclohexadiene is taken overhead as product via conduit 48 and the kettle product, comprising dichlorocyclohexane, is passed via conduit 49 to dehydrochlorination furnace 32.

The overhead product from azeotropic column 39 in conduit 41 is admixed with hydrogen supplied via conduit 51, passed through heat exchanger 52 and thence to a hydrogenation reactor 53 where the benzene is hydrogenated to cyclohexane. The effluent from hydrogenation reactor 53 is passed via conduit 54 through heat exchanger 52 and cooler 55 and thence to phase separator 56 where hydrogen is recovered and passed overhead via conduit 51. Make-up hydrogen is added to conduit 51 by conventional means (not shown). The liquid products in phase separator 56 comprising cyclohexane and methylcyclopentane are passed via conduit 57 to isomerization reactor 58 where the methylcyclopentane is isomerized to cyclohexane. The effluent from isomerization reactor 58 is passed to a settler 59 where entrained isomerization catalyst settles and is returned to the isomerization reactor via conduit 61. The isomerization reactor effluent, freed of catalyst, is removed from settler 59 via conduit 62 and passed to hydrogen chloride stripper 63 where hydrogen chloride is vaporized and removed via conduit 64. The liquid products in stripper 63 are passed via conduit 65 to methylcyclopentane column 66 where methylcyclopentane is removed overhead as vapor and passed via conduit 67 to isomerization reactor 58. The liquid products in column 66 are passed to cyclohexane column 68 where cyclohexane is removed overhead as vapor via conduit 69 and materials heavier than cyclohexane are removed from column 68 via conduit 70.

The halogenation of cyclohexane is advantageously carried out in a plurality of stages with halogen halide removal, resaturation with halogen and cooling between stages so as to achieve a relatively high dihalocyclohexane content in the effluent with a minimum of polyhalides heavier than the dihalide. Unreacted cyclohexane and monohalocyclohexane are then removed and returned to the photochemical halogenation reaction. Although any of the halogens can be utilized in this reaction, bromine and chlorine are usually used and chlorine is most commonly used. In the description of the invention chlorine will be the halogen discussed.

The process of the present invention is made economically feasible by the novel dehydrochlorination step. We have discovered that dichlorocyclohexane can be dehydrochlorinated to cyclohexadiene efficiently, rapidly and economically by passage through a reactor made of an iron-containing metal at a relatively high temperature and a very short residence time in the reactor. Stainless steel is a preferred metal for construction of the reactor because of its resistance to high temperature; however, iron or other iron-containing metal can be used. The reactor is preferably, though not necessarily, fabricated in the form of a tube because such configuration is favorable to rapid transfer of heat into the material in the reactor. The reactor effluent is rapidly cooled by indirect heat exchange with the reactor feed and, if necessary or desired, further cooled by indirect heat exchange in a conventional cooler.

The temperature used in the reactor is about that required for thermal dehydrochlorination of dichlorocyclohexane but the residence time is very much shorter than that which would appreciably effect dehydrochlorination. It is believed that the iron content of the reactor has some catalytic effect on the reaction; however, by-products resulting from isomerization and other side reactions usually associated with catalytic dehydrochlorination are, to a great extent, eliminated by the process of our invention.

Benzene, a by-product, can be removed from the dehydrochlorination effluent as an azeotrope with methyl cyclopentane and hydrogenated to cyclohexane which is then recycled to the chlorination reaction. The methylcyclopentane can be isomerized to cyclohexane and also returned to the chlorination reaction.

The invention will be further demonstrated by reference to the following specific embodiment which is considered exemplary and should not be construed as limiting the invention unduly.

EXAMPLE

Cyclohexane was photochemically chlorinated in three stages with hydrogen chloride removal, chlorine saturation, and cooling between stages. The preferred operating conditions and those practiced are shown in Table I. Dichlorocyclohexane was separated from the chlorination reaction and passed to the dehydrochlorination reaction. The operating conditions for and results obtained from three separate runs are shown in Table II.

Benzene was removed from the dehydrochlorination reaction product as an azeotrope with methylcyclopentane and was hydrogenated to cyclohexane. The operating conditions for the azeotropic distillation of benzene and methylcyclopentane are shown in Table III. The preferred operating conditions for hydrogenating benzene to cyclohexane and those practiced are shown in Table IV.

Methylcyclopentane was isomerized to cyclohexane and the preferred and practiced operating conditions are shown in Table V.

The cyclohexadiene product, containing cyclohexene as an impurity, was purified by azeotropic distillation with a mixture of water and isobutyl alcohol. The operating conditions for the azeotropic distillation are shown in Table VI.

The preferred and optimum operating conditions for dehydrochlorination of dichlorocyclohexane are shown in Table VII.

TABLE I.—PHOTOCHEMICAL CHLORINATION CONDITIONS

| | Preferred Range | Practiced |
|---|---|---|
| Number of Chlorination Stages | 1-5 | 3 |
| Conversion per Stage, Wt. Percent of Feed | 10-15 | 12 |
| Reaction Pressure, P.s.i.g | 20-80 | 50 |
| Residence Time in Reactor, Sec. (Liq. Phase) | 6-21 | 12 |
| Inlet Temperature, °F | 45-80 | 50 |
| Outlet Temperature, °F | 150-200 | 175 |

TABLE II.—DEHYDROCHLORINATION OF DICHLOROCYCLOHEXANE

| | Feedstock | Run Number 1 | Run Number 2 | Run Number 3 |
|---|---|---|---|---|
| Process Conditions: | | | | |
| Furnace Coil | | 20' of ¼" Type 321 Tube, 0.035" W | | |
| Reactor Outlet Temp., °F | | 890 | 902 | 950 |
| Pressure, P.s.i.g | | 2 | 6 | 6 |
| Feed Rate, Vol. of Liq./Vol. Coil/Hr | | 3.4 | 5.4 | 5.6 |
| Analytical Data, GLC [1] Wt. Percent: | | | | |
| Light | 0.84 | 0.3 | <0.1 | 0.2 |
| Benzene | | 30.5 | 7.1 | 22.3 |
| Cyclohexene | | 2.8 | 0.9 | 2.3 |
| 1,3-cyclohexadiene | | 52.3 | 34.2 | 49.9 |
| 1,4-cyclohexadiene | | 0.7 | 1.7 | 0.8 |
| Monochlorocyclohexane | 1.55 | 11.3 | 3.9 | 11.6 |
| Dichlorocyclohexane | 97.51 | 1.7 | 46.4 | 11.8 |
| Heavies | 0.10 | 0.4 | 5.8 | 1.1 |
| Total | 100.00 | 100.0 | 100.0 | 100.0 |
| Results: | | | | |
| Conversion, Wt. Percent of Feed | | 99.0 | 68.0 | 93.0 |
| Selectivity, Wt. Percent to Diene [2] | | 60.2 | 67.0 | 65.2 |

[1] Gas-Liquid Chromatography.
[2] In selectivity calculation, monochlorocyclohexene is considered suitable for recycle.

TABLE III.—PURIFICATION-AZEOTROPIC DISTILLATION OF BENZENE

| | |
|---|---|
| Methylcyclopentane rate to azeo column | (Column feed rate, lb.) (percent benzene) (9.0). |
| Azeo column OHP composition | 10% benzene, 90% methylcyclopentane. |
| Azeo column OH conditions | 71.4° C., atm. pressure. |

TABLE IV.—BENZENE HYDROGENATION CONDITIONS

| | Preferred Range | Practiced |
|---|---|---|
| Type of Catalyst: Harshaw Ni 0101T ⅛" Extrudate. | | |
| Total Reactor Feed, Mols/Lb. Catalyst/Hr | 0.03-0.30 | 0.10 |
| Cyclohexane to Benzene, Mol Ratio | 6-20 | 12 |
| Hydrogen to Benzene, Mol Ratio | 6-27 | 9 |
| Reactor Pressure, P.s.i.g | 450-550 | 475 |
| Reactor Outlet Temperature, °F | 450-500 | 480 |
| Separator Temperature, °F | 80-180 | 100 |
| Benzene Conversion: Essentially 100%. | | |

TABLE V.—METHYL CYCLOPENTANE ISOMERIZATION CONDITIONS

| | Preferred Range | Practiced |
|---|---|---|
| Type of Catalyst: Aluminum Chloride Complex. | | |
| Catalyst Promoter: Hydrogen Chloride. | | |
| AlCl₃ Content of Catalyst, Wt. Percent | 65-70 | 68 |
| HCl Conc. in Catalyst, Wt. Percent | 3-5 | 4.0 |
| Reactor Pressure, P.s.i.g | 150-160 | 155 |
| Reactor Temperature, °F | 130-160 | 150 |
| Reactor Residence Time, Min | 20-40 | 30 |
| MCP Conversion per Pass | 70-75 | 75 |

TABLE VI.—PURIFICATION-AZEOTROPIC DISTILLATION OF CYCLOHEXENE

| | |
|---|---|
| Water (56 wt. percent)-Isobutyl alcohol (44 wt. percent) rate to azeo column | (Column Feed Rate, lb.) (percent cyclohexene) (0.20). |
| Azeo column OHP composition | 9.3 wt. percent water, 7.3 wt. percent isobutyl alcohol, 83.4 wt. percent cyclohexene. |
| Azeo column OH conditions | 158° F. atm. pressure. |

TABLE VII.—DEHYDROCHLORINATION CONDITIONS

| | Preferred Range | Practiced |
|---|---|---|
| Feed Rate, Vol. Liq./Vol. Thermal Reactor/Hr | 2–8 | 5 |
| Inlet Temperature, °F | 400–500 | 450 |
| Outlet Temperature, °F | 800–1,110 | 900 |
| Thermal Reactor Pressure, P.s.i.g | 0–50 | 10 |
| Reactor Material, Type of Stainless | 304 or 321 | 321 |
| Conversion, Wt. Percent of Feedstock | 50–100 | 93 |

The dehydrochlorination reaction is the critical and controlling step in the process of the claims. The reaction is sensitive to temperature and residence time (space velocity) and is not appreciably sensitive to pressure; therefore, pressure can be varied to control space velocity at constant temperature and feed rate.

In Run 1 the residence time was longer than in Run 2 and the temperature was about the same. The dichlorocyclohexane was practically completely dehydrochlorinated but a considerable amount of benzene was formed. In Run 2 very little benzene was formed, but a substantial amount of dichlorocyclohexane was unconverted. Also, in Run 2 the selectivity or ultimate yield is greater. Thus, flexibility in product distribution is possible by varying one variable, e.g., residence time or space velocity.

If maximum yield of cyclohexadiene is desired, the conditions of Run 2 are preferred because recycle of unconverted dichlorocyclohexane is simple and inexpensive because of the short residence time in the dehydrochlorination step. Recycle of benzene requires the additional steps of hydrogenation and chlorination.

A flexible and efficient process is made possible by practice of the invention.

That which is claimed is:

1. A method for producing substantially pure cyclohexadiene consisting essentially of the steps of:
   (a) reacting chlorine with cyclohexane in a chlorination zone under chlorination conditions so as to produce a substantial amount of dichlorocyclohexane;
   (b) dehydrochlorinating said dichlorocyclohexane in a dehydrochlorination zone under dehydrochlorination conditions;
   (c) distilling the effluent from said dehydrochlorination step in a first azeotropic distillation step in the presence of methylcyclopentane so as to remove an azeotropic mixture of methylcyclopentane and benzene;
   (d) hydrogenating said mixture of methylcyclopentane and benzene in a hydrogenation zone under hydrogenation conditions to convert the benzene substantially completely to cyclohexane;
   (e) isomerizing the effluent from said hydrogenation step in an isomerization zone under isomerization conditions to convert the methylcyclopentane substantially to cyclohexane;
   (f) passing the cyclohexane produced in steps (d) and (e) to said chlorination zone;
   (g) distilling the kettle product from said first azeotropic distillation step in a second azeotropic distillation step with a mixture of water and isobutyl alcohol so as to remove an azeotropic mixture of cyclohexene, water, and isobutyl alcohol;
   (h) separating and recovering substantially pure cyclohexadiene from the kettle product of said second azeotropic distillation step.

2. The method of claim 1 wherein chlorine is reacted with cyclohexane in the presence of light and hydrogen chloride is removed from said chlorination zone;
   wherein said dehydrochlorination zone comprises a stainless steel reactor;
   and wherein said dehydrochlorination conditions comprise a temperature of about 800 to 1100° F. and a space velocity of about 2 to 8 volumes of liquid per volume of reactor per hour.

References Cited

UNITED STATES PATENTS

| | | | |
|---|---|---|---|
| 2,182,242 | 12/1939 | Wooster | 260—666 |
| 2,243,191 | 5/1941 | Cantzler | 260—666 |
| 2,287,665 | 6/1942 | Britton | 260—666 |
| 2,373,673 | 4/1945 | Fuller | 260—666 |
| 2,948,667 | 8/1960 | Limido | 260—666 |
| 3,284,521 | 11/1966 | Fritz et al. | 260—666 |
| 3,250,816 | 5/1966 | Waldly | 260—666 |
| 3,290,400 | 12/1966 | Schwarz et al. | 260—666 |
| 3,329,731 | 7/1967 | Holiday | 260—666 |

OTHER REFERENCES

Azeotropic Data, compiled by L. H. Horsley et al., Number Six, Advances in Chemistry Series, American Chemical Society, p. 259, 1952.

DELBERT E. GANTZ, *Primary Examiner.*

V. O'KEEFE, *Assistant Examiner.*